United States Patent [19]
Foladare et al.

[11] Patent Number: 6,032,023
[45] Date of Patent: *Feb. 29, 2000

[54] COMMUNICATION SYSTEM AND METHOD USING TWO-WAY PAGING TO PROVIDE CALL CONTROL

[75] Inventors: Mark Jeffrey Foladare, Kendall Park; Shelley Betty Goldman, East Brunswick; David Phillip Silverman, Somerville; Roy Philip Weber, Bridgewater, all of N.J.

[73] Assignee: AT&T, New York, N.Y.

[ * ] Notice: This patent is subject to a terminal disclaimer.

[21] Appl. No.: 09/222,416

[22] Filed: Dec. 29, 1998

Related U.S. Application Data

[63] Continuation of application No. 08/579,184, Dec. 27, 1995.

[51] Int. Cl.[7] .............................. H04B 7/00; H04M 3/42; H04Q 7/20
[52] U.S. Cl. ......................... 455/31.3; 455/461; 455/417; 455/414
[58] Field of Search ................................. 455/31.3, 417, 455/414, 412, 461, 445, 31.2, 31.1, 403, 413, 415, 459, 458, 426; 340/825.44, 311.1

[56] References Cited

U.S. PATENT DOCUMENTS

| | | | |
|---|---|---|---|
| Re. 33,417 | 10/1990 | Bhagat et al. | 340/825.44 |
| 4,661,972 | 4/1987 | Kai . | |
| 4,680,785 | 7/1987 | Akiyama et al. . | |
| 4,748,655 | 5/1988 | Thrower et al. | 455/458 |
| 4,860,005 | 8/1989 | DeLuca et al. | 341/825.44 |
| 4,951,043 | 8/1990 | Minami . | |
| 4,951,044 | 8/1990 | Nelson et al. . | |
| 4,994,797 | 2/1991 | Breeden . | |
| 5,045,850 | 9/1991 | Andros et al. . | |
| 5,109,220 | 4/1992 | Breeden et al. . | |
| 5,140,626 | 8/1992 | Ory et al. . | |
| 5,151,929 | 9/1992 | Wolf | 455/31.2 |
| 5,151,930 | 9/1992 | Hagl . | |
| 5,202,912 | 4/1993 | Breeden et al. . | |

(List continued on next page.)

FOREIGN PATENT DOCUMENTS 9107838  5/1991  WIPO .

OTHER PUBLICATIONS

C. Colavito and M. Saba, "The Integrated Mobile Telephone & Paging System", IEEE Conference Proceeding, Jun. 9–11, 1969, Boulder, Co.

*Primary Examiner*—Dwayne D. Bost
*Assistant Examiner*—Tracy M. Legree
*Attorney, Agent, or Firm*—Morgan & Finnegan LLP

[57] ABSTRACT

A system and method of using two-way paging to establish communications with a mobile party having a Personal Telephone Number. The mobile party is equipped with a two-way pager which the party may use to provide call control. The pager is periodically queried by a network and/or paging service to determine whether or not the pager is reachable. If the pager becomes unreachable, and thereafter a call is placed to the party's Personal Telephone Number, the network routes the call to a default station. If the pager is reachable, any one of a number of alternative call routing procedures may be invoked including: registration type routing, call-by-call routing, revertive calling, call examination routing, and subsequent routing. In one possible embodiment, a Customer Routing Point is used to store the pager status along with other call routing information, and a Network Control Point is used to carry out the appropriate routing procedure. Other possible embodiments include: using an adjunct to perform the functions of the Customer Routing Point and Network Control Point; and combining an adjunct with a Customer Routing Point and Network Control Point.

11 Claims, 13 Drawing Sheets

U.S. PATENT DOCUMENTS

| | | |
|---|---|---|
| 5,243,645 | 9/1993 | Bissell et al. . |
| 5,307,399 | 4/1994 | Dai et al. . |
| 5,311,570 | 5/1994 | Grimes et al. ................ 455/31.1 |
| 5,313,515 | 5/1994 | Allen et al. ................... 455/413 |
| 5,315,636 | 5/1994 | Patel ............................. 455/461 |
| 5,327,486 | 7/1994 | Wolff et al. . |
| 5,371,781 | 12/1994 | Ardon . |
| 5,375,162 | 12/1994 | Kim et al. . |
| 5,414,750 | 5/1995 | Bhagat et al. . |
| 5,440,614 | 8/1995 | Sonberg et al. ............... 455/413 |
| 5,473,671 | 12/1995 | Partridge, III ................ 455/445 |
| 5,559,859 | 9/1996 | Dai et al. ....................... 455/459 |
| 5,574,771 | 11/1996 | Driessen et al. .............. 455/31.3 |
| 5,610,970 | 3/1997 | Fuller et al. .................. 455/31.2 |

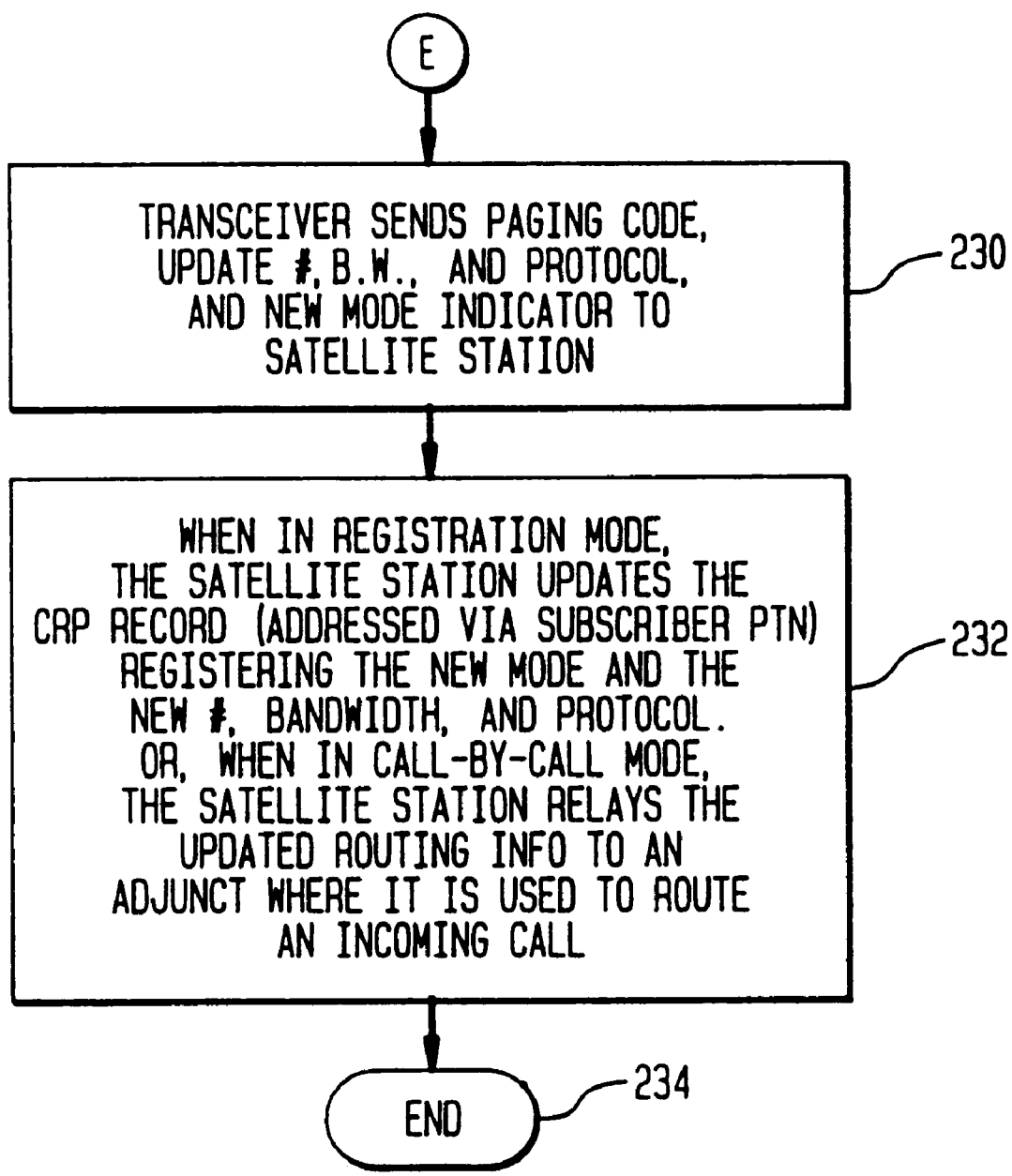

COMMUNICATION SYSTEM AND METHOD USING TWO-WAY PAGING TO PROVIDE CALL CONTROL

CROSS-REFERENCE TO RELATED APPLICATION

This application is a continuation application of co-pending U.S. application Ser. No. 08/579,184, filed Dec. 27, 1995.

This application is related to commonly assigned pending U.S. patent application Ser. Nos. 08/379,425 and 08/379,430; and is related to three commonly assigned, concurrently filed, pending U.S. patent applications entitled: COMMUNICATION SYSTEM AND METHOD USING TWO-WAY PAGING TO PROVIDE CALL CONTROL (U.S. patent application Ser. Nos. 08/579,188, 08/579,539 and 09/325,755), which are hereby incorporated by reference.

TECHNICAL FIELD

This invention relates to communications systems, and more particularly to using paging technology to establish communications with a mobile party.

BACKGROUND OF THE INVENTION

In general, persons wishing to contact a particular party initiate a call to a telephone specifically known to be associated with that party, such as the party's office or wireless telephone. A disadvantage of this method of communication is that parties are not always in close proximity to such associated telephones, or for that matter, in close proximity to any telephone. This presents a problem to persons who need to immediately contact a mobile party, regardless of that party's location.

Several technologies have developed in an effort to solve the problem of establishing communication with a mobile party. These include call forwarding, paging, and cellular systems. However, each of these technologies has drawbacks which prevent seamless and ubiquitous communication.

The inventions disclosed in the application Ser. Nos. 08/379,425 and 08/379,430 (the '425 and '430 inventions, respectively), cited hereinabove, address many of the problems associated with prior systems used to communicate with mobile individuals. Generally, both of those inventions describe a call routing scheme in which each subscriber is assigned a Personal Telephone Number (PIN) and uses a two-way pager to route calls directed to that number. In the '430 invention, when a call is placed to the subscriber's PTN, a network database query is generated and information about how to handle the call is retrieved (referred to as "registration" type routing). In the '425 invention, when a call is placed to the subscriber's PTN, the subscriber's pager number is retrieved from the database and an alerting page is sent to the subscriber. The subscriber may then use the two-way pager to transmit a terminating number back to the network in response to the alerting page (referred to as "call-by-call" type routing).

Despite the numerous advantages of the '425 and '430 inventions, they do not account for those situations in which a subscriber is unable, or unwilling, to respond to a call-by-call alerting page when that mode of routing is invoked. In such "subscriber unavailable" situations, inadequate call treatment can waste network resources and result in the subscriber missing important calls. For example, consider a situation in which a subscriber goes to work and leaves her two-way pager at home. If the subscriber has specified call-by-call mode and a call is placed to the subscriber's PTN then the network will hold the call, page the subscriber, and await a response. A response, however, will not be provided since the subscriber is unavailable. One way to handle such a situation is to automatically route the call to voice mail following a predetermined "time out" period.

Although a time out procedure provides a method for dealing with the subscriber unavailable problem, the procedure has drawbacks. One drawback of the time out procedure is that it requires that an unnecessary page be sent. Another drawback of the time out procedure is that there exists a possibility that a caller will not continue to hold on the call for the duration of the time out period, in which case the subscriber will "miss" the call.

SUMMARY OF THE INVENTION

The present invention employs a two-way paging technique to overcome the disadvantages present in the prior systems used to communicate with mobile individuals while at the same time providing an efficient call handling treatment for subscriber unavailable situations. In accordance with the invention, a subscriber's two-way pager is queried to determine its accessibility. Such a query need not result in the pager generating an alert to the subscriber. If the pager does not respond to the query, it is assumed that the pager (and therefore the subscriber) is "unreachable", and pages that would otherwise be broadcast to the subscriber's two-way pager are not broadcast, at least until certain predefined conditions are subsequently met. Situations in which the pager will fail to respond include those instances in which: (a) the pager has been turned off, (b) the pager is outside the paging range, and (c) the pager's battery has expired. Not broadcasting a subscriber's pages in those situations where the pager is unreachable avoids the generation and transmission of unnecessary pages, and so the resources needed to broadcast those pages are not wasted.

A mobile person who wishes to take advantage of the present invention is equipped with a two-way pager and is assigned a Personal Telephone Number (PTN). The mobile person uses the pager to transmit one or more call control parameters to a paging service which, in turn, relays the parameters to the telephone network. The network may then use the parameters to control calls directed to the mobile person's PTN. For example, the parameters may include a terminating station number, to which calls directed to the PTN are to be routed. The parameters may be transmitted on a "call-by-call" basis, in which case the mobile person transmits the parameters in response to a page alerting the mobile person of a call to the PTN.

The two-way pager is designed such that the paging service can determine whether or not the pager is reachable prior to sending a page in response to a call. Such a determination may be made by the paging service alone or by the paging service in response to a request from the network, but whatever the case, the results of the determination may be stored by the paging service, by the network, or by some combination of the two. When it has been determined that the two-way pager of a call-by-call mode subscriber is unreachable, calls to that subscriber do not generate a page, but rather, they are routed to some predetermined terminating number. In a preferred embodiment, the pager is equipped with an "automatic turn off", such as a body temperature sensor, which turns the pager off when the pager is not being worn. Prior to turning the pager off, the sensor may initiate a transmission to the paging service, notifying the service that the pager is unreachable. Accordingly, pages will not be sent in those situations where the subscriber is unavailable.

Thus, the network is apprised, prior to generating a call-by-call alerting signal, that the pager is unreachable. In this manner, the network can avoid allocating network and/or paging service resources to the generation of a page that will not be received. Moreover, when the pager is equipped with the "automatic off" feature of the preferred embodiment, unnecessary pages and missed calls can be avoided in those situations where the subscriber is not carrying the pager but has neglected to turn it off.

BRIEF DESCRIPTION OF THE DRAWINGS

FIGS. 4A and 4B make up a flow chart depicting the procedure followed to update a subscriber's terminating number.

DETAILED DESCRIPTION

Figure 1:
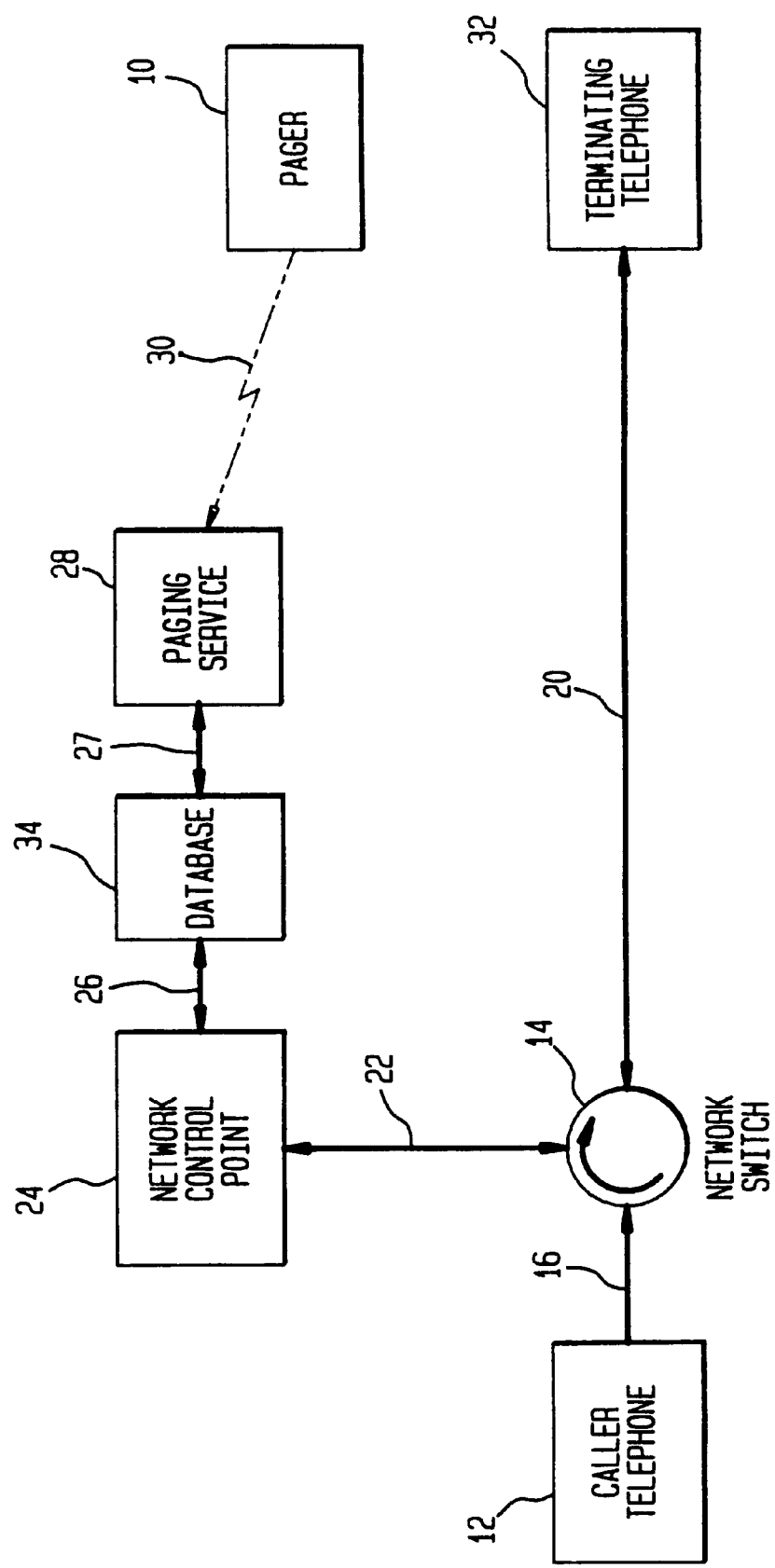
FIG. 1 is a block-schematic diagram of a communications system in accordance with the present invention.

Referring to FIG. 1, there is shown a block diagram of a communication system incorporating the present invention. In accordance with the invention, a caller will be able to route a call to a mobile party who is equipped with a two-way pager 10. The caller initiates the call via a caller telephone 12. At this point it should be noted that the caller telephone, like all other telephones hereinafter discussed, is used merely as an illustration, and that the invention may be implemented using a variety of communication devices, including, but not limited to telephones, computers, facsimile machines, video telephones, and multimedia terminals.

In any event, caller telephone 12 is coupled to a network access switch 14 by a first communication coupling 16. (Note: first communication coupling 16, and all communication couplings hereinafter described, may take the form of a telephone line, twisted pair line, coaxial cable, fiber optic line, wireless link, or any other type of communication coupling.) A second communication coupling 22 couples the network access switch 14 to a Network Control Point (NCP) 24, which is, in turn, coupled to a database 34 via a third communication coupling 26. The database is coupled to a paging service 28 via a fourth communication coupling 27. The mobile party uses the pager to transmit a routing signal, represented by wireless link 30, to the paging service. The routing signal includes one or more call control parameters that are associated with a terminating telephone 32, such as a terminating number, a bandwidth, and a protocol. The routing signal may also include a pager identification number, which can be used by the paging service to identify the transmitting pager. Although bandwidth and protocol are used throughout this description as illustrative call control parameters, it should be understood that other types of parameters may be used without departing from the principles of the invention.

Upon receiving the routing signal from the pager, the paging service relays the signal to the database where the terminating number, bandwidth, and protocol are extracted from the signal and stored. The terminating number, bandwidth, and protocol supplied by the mobile party is cross-referenced with the party's PTN so that whenever the party's PTN is dialed the number, bandwidth, and protocol for that party may be retrieved from the database.

When a caller initiates a call by dialing the mobile party's PTN, the call is coupled to network access switch 14 via first communication coupling 16. The network access switch 14 then queries the NCP for instructions via second communication coupling 22, and the NCP, in turn, queries the database through third communication coupling 26. Based on the dialed PTN, the database retrieves the mobile party's terminating number, bandwidth, and protocol and passes them back to the NCP via the third communication coupling. The NCP, in turn, passes the number, bandwidth, and protocol to the network access switch 14 which uses the parameters to reroute the call to terminating telephone 32. The network access switch 14 reroutes the call to the terminating telephone via a fourth communication coupling 20. At this point, the call may be answered by the mobile party at the terminating telephone.

In light of the foregoing description, it will be apparent to those of skill in the art that the database 34 may be incorporated into NCP 24 or paging service 28, in which case the present invention may be implemented without a separate database element. It will also be apparent that the routing signal may include any combination of the terminating number, bandwidth, and protocol elements. For example, the two-way pager may be used in the call-by-call mode to transmit only a terminating number and bandwidth, while the protocol is assumed to be the most recently registered protocol.

Figure 2:
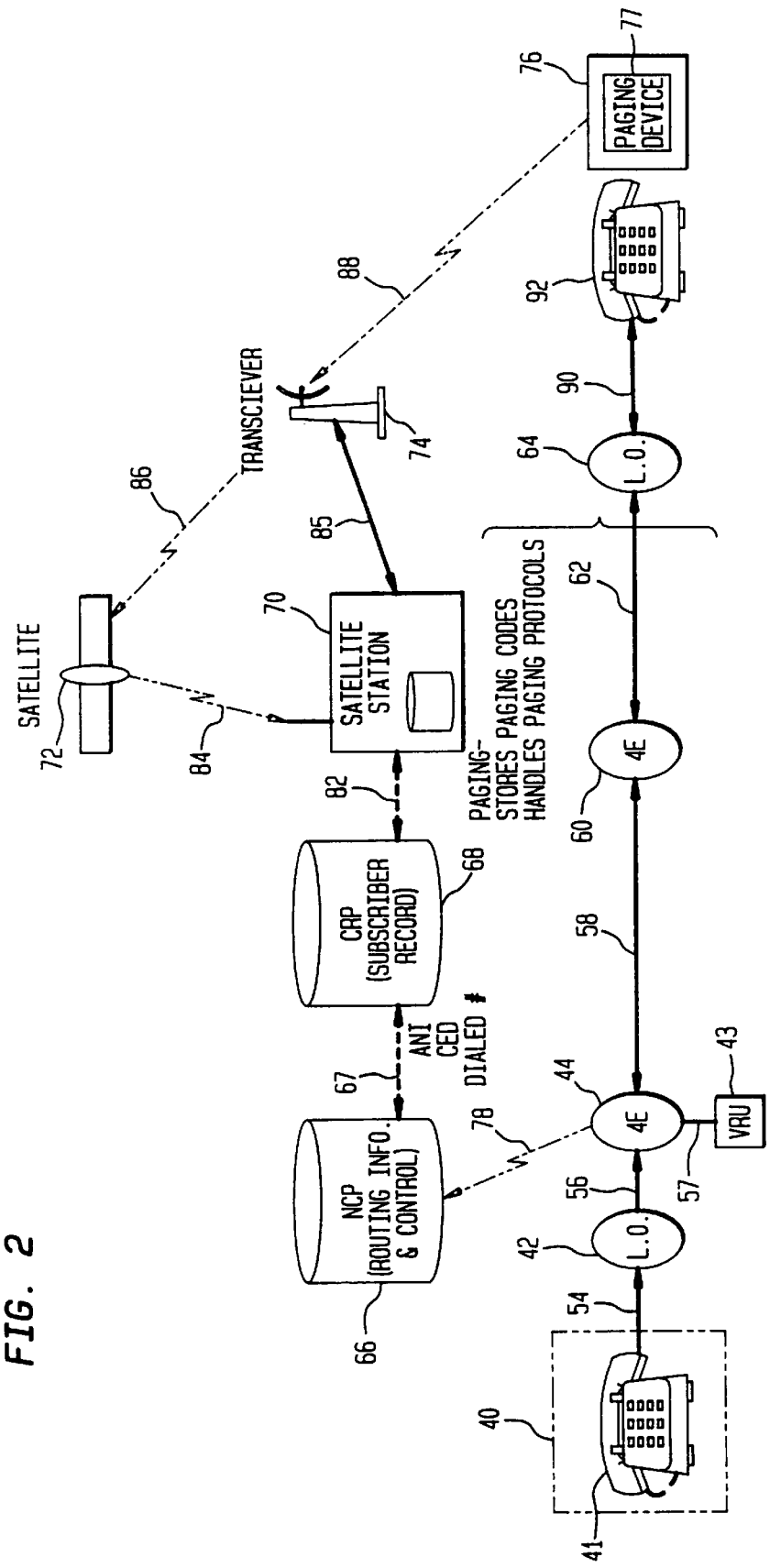
FIG. 2 is a block-schematic diagram of a preferred embodiment of a communication system incorporating the present invention.

In a preferred embodiment, as shown in FIG. 2, the present invention is incorporated into an existing telephone network. As shown in the figure, a caller 40 seeks to establish communications with a mobile party, or "subscriber", 76 who is assigned a Personal Telephone Number (PTN) and is equipped with a two-way pager 77. The caller initiates an incoming call from a telephone 41 by dialing the subscriber's PTN. This incoming call is coupled to a first local office 42 in the caller's locality through a first telephone line 54. The first local office routes the call to an originating access switch 44 over a first trunk line 56. Switch 44 may take the form of a digital switch, or an electronic switching system, such as an AT&T 4ESS™ switch ("4E" switch). For a more complete description of a 4E switch see, *The Bell System Technical Journal*, Vol. 56, No. 7, pp 1015–1320, pub. September 1977.

Once the call has been routed to switch 44, switch 44 queries a Network Control Point (NCP) 66 via a first Common Channel Interoffice Signaling (CCIS) link 78. (Common Channel Interoffice Signaling refers the transmission of call control signaling between telephone offices, wherein a plurality of call control channels are multiplexed onto a single data link). At this point, if the subscriber has provisioned for the collection of Customer Entered Digits (CED) the NCP instructs switch 44 to couple the call to a Voice Response Unit (VRU) 43 via a first communication link 57. The VRU (e.g. an AT&T Network Services Complex, or NSCX) then plays a standard prompting announcement to the caller and collects the CED (e.g. a Personal Identification Number, or PIN) via the reception of up to 10 digits, which may be indicated in the form of Dual Tone Multi-Frequency (DTMF) signals. In a system using a CED, provision must be made for the case where a caller can not enter digits because the caller is at a rotary dial station or does not respond to the prompt. In these two situations, the VRU may allow for a time-out or an abbreviated dialing sequence (e.g., #) to denote that no digits are forthcoming. Any CED collected by the VRU is passed back to the NCP.

After the collection of CED, or immediately after the originating access switch queries the NCP, whatever the case may be, the NCP queries a Customer Routing Point (CRP) 68 via a second CCIS link 67. In the query, the NCP sends the CED, the PTN, and the caller telephone number (Automatic Number Identification number, or "ANI"). Based on the ANI and/or CED, the CRP screens the call, deciding whether or not the call is to be routed directly to the subscriber. If the call is not to be routed directly to the subscriber, the CRP instructs the NCP to route the call to an alternate treatment, such as a voice mailbox. If the call is to be routed directly to the subscriber, the CRP accesses a subscriber record stored within the CRP, retrieves a terminating number, bandwidth, and protocol for the subscriber from the record, and returns the parameters to the NCP via CCIS link 67. The NCP relays the terminating number, bandwidth, and protocol to the originating access switch via CCIS link 78 where the parameters are used to reroute the incoming call.

The subscriber may update the terminating number, bandwidth, and protocol at any time using the two-way pager. To update the terminating number, bandwidth, and protocol, the subscriber 76 generates a routing signal containing the new parameters using two-way pager 77. The routing signal is transmitted to a paging service transceiver 74. The transceiver relays the signal to a satellite ground station 70, either directly, via communication coupling 85, or indirectly, via wireless link 86, satellite 72, and wireless link 84 via wireless link 86. The satellite ground station, in turn, passes the signal to the CRP via a second communication link 82. The CRP extracts the new terminating number, bandwidth, and protocol and uses it to update the subscriber's CRP record.

Calls are routed based on the most recent update of the CRP record. As described above, whenever an incoming call passes screening by the CRP, NCP 66 retrieves the terminating number, bandwidth, and protocol from CRP 68 and passes it to originating access switch 44 for use in rerouting the call to a terminating telephone 92. Rerouting from the originating access switch to the terminating telephone is achieved through: a second trunk line 58, a terminating access switch 60 (which, like switch 44, may be a digital switch or a 4E switch), a third trunk line 62, a second local office 64, and a second telephone line 90. The originating access switch couples the call to the terminating access switch over the second trunk line. The terminating access switch, in turn, couples the call to the second local office over the third trunk line. The second local office then couples the call to the terminating telephone over the second telephone line. After rerouting is complete the call may be answered by the subscriber at the terminating telephone.

Figure 3:
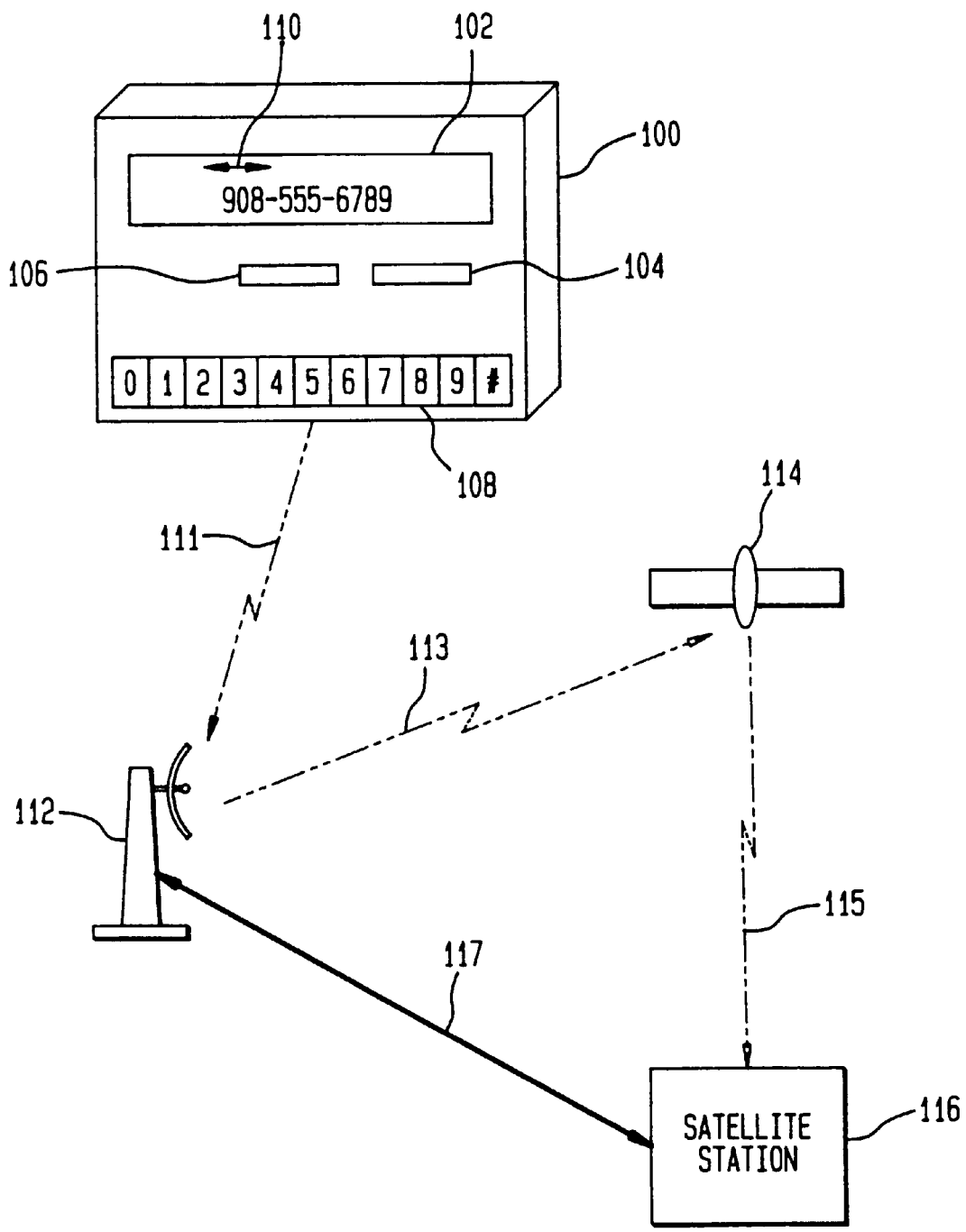
FIG. 3 shows a pager appropriate for use in accordance with the present invention.

FIG. 3 shows an illustrative embodiment of a two-way pager 102, a transceiver 112, a satellite 114, a satellite ground station 116, wireless links 111, 113 and 115, and a communication link 117, the embodiment being suitable for use in accordance with the present invention. The pager 100 includes: a display 102, such as a liquid crystal display or light emitting diode display; a select key 104; a menu key 106; a keypad 108; and a mode indicator 110, that may be included within the display 102. FIG. 3 will be referenced in the following discussion of the flowchart in FIGS. 4A and 4B.

Figure 4A:
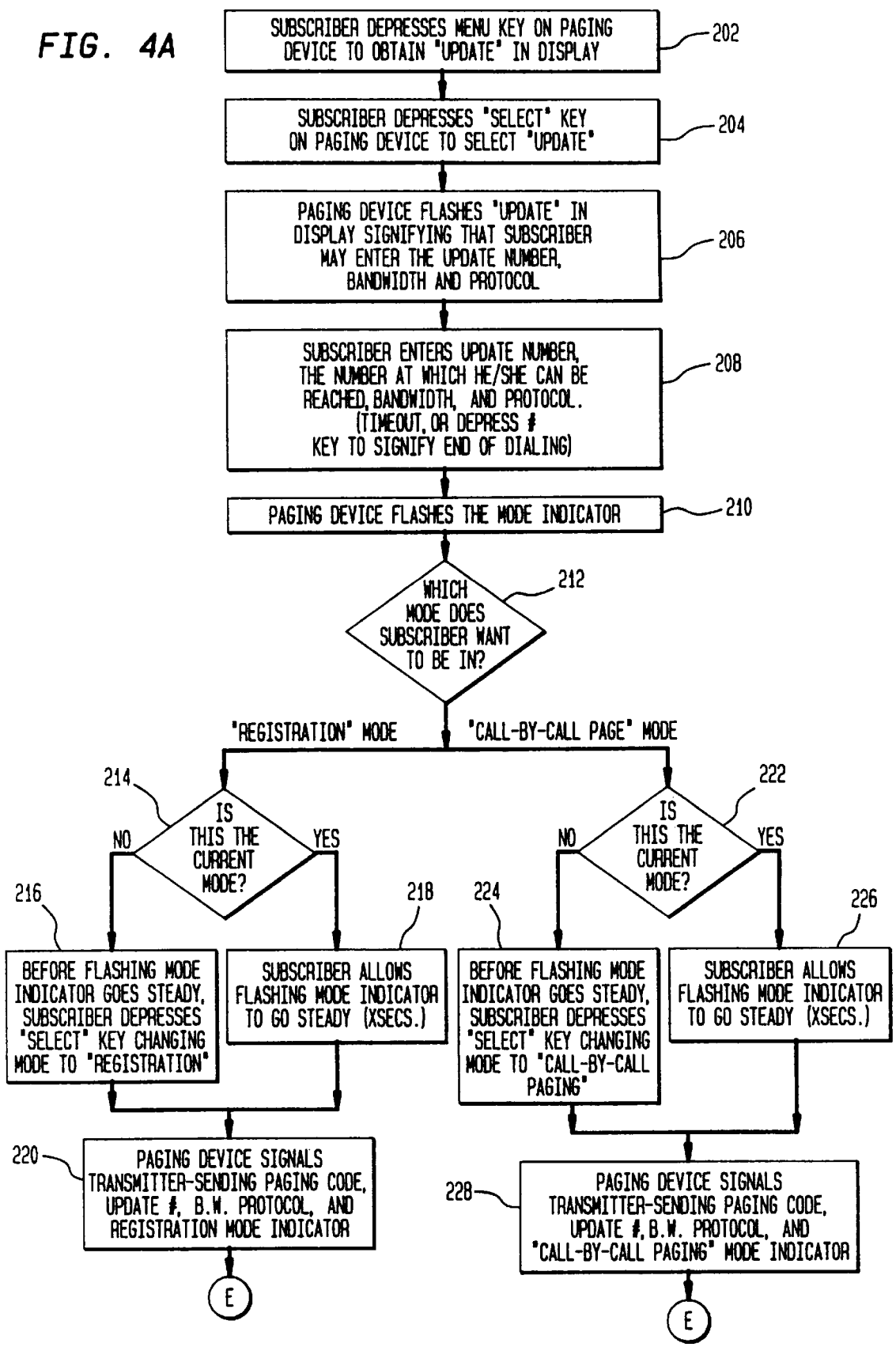

FIGS. 4A and 4B show the steps taken in updating the subscriber's terminating number. The pager of FIG. 3 may be used to update the terminating number on a "registration" basis, as described in cross-referenced application Ser. No. 08/379,430, or on a "call-by-call" basis, as described in cross-referenced application Ser. No. 08/379,425. Thus, the description that follows includes provisions for both "registration" and "call-by-call" updating.

The first step the subscriber takes to update the terminating number, bandwidth, and protocol is to depress menu key 104 on pager 100 (step 202). The word "update" will appear in display 102. The subscriber then depresses select key 106 to select "update" (step 204). The word "update" will flash in the display to indicate that the subscriber may enter the updated information (step 206). The subscriber may now input the terminating number, bandwidth, and protocol via keypad 108, followed by the # key to indicate the end of input (step 208). To enter a special call handling instruction (as described in application Ser. No. 08/379,425), such as a conference call instruction, a number associated with that instruction would be input rather than a terminating number (step 208). A subscriber who does not want to change the terminating number, bandwidth, or protocol, and does not want to input a special instruction number may simply depress the # key without keying in any information.

Moreover, in a preferred embodiment, the pager is equipped with the ability to store terminating numbers, bandwidths, and protocols so that abbreviated key sequences may be used in lieu of manually entering updates. For example, the subscriber's office telephone number may be stored in the pager's memory at a first location and the subscriber's home telephone number may be stored in the pager's memory at a second location. Thereafter, when the subscriber wants to change the terminating number to the office number, the subscriber simply keys in a 1 followed by the # sign. Similarly, when the subscriber wants to change the terminating number to the home number, the subscriber simply keys in a 2 followed by the # sign.

In any case, after receiving a # input, the pager's mode indicator will flash (step 210). At this point, the subscriber must select the desired mode (step 212). The pager determines if the desired mode is the current mode (step 214 when desired mode is registration mode; step 222 when desired mode is call-by-call mode). If the subscriber desires the registration mode and the current mode is not the registration mode, then before the flashing mode indicator goes steady, the subscriber depresses select key 106 to change to registration mode (step 216). If the subscriber desires the registration mode and the current mode is the registration mode, the subscriber allows a period of time to pass, after which the flashing mode indicator will go steady;

or, in the alternative, the subscriber may depress the # key to curtail timing and retain the current mode (step 218).

Similarly, if the subscriber desires the call-by-call mode and the current mode is not the call-by-call mode, then before the flashing mode indicator goes steady, the subscriber depresses select key 106 to change to call-by-call mode (step 224). If the subscriber desires the call-by-call mode and the current mode is the call-by-call mode, the subscriber allows a period of time to pass, after which the flashing mode indicator will go steady; or, in the alternative, the subscriber may depress the # key to curtail timing and retain the current mode (step 226). After the mode has been selected, the pager signals the transceiver 112 via wireless link 111, sending the pager code, updated terminating number, updated bandwidth, updated protocol, and a mode indicator (step 220 for registration mode; step 228 for call-by-call mode).

Following reception of the pager's transmission, the transceiver 112 relays the pager code, new call control parameters, and mode indicator to the satellite ground station 116 (step 230), either directly, over communication coupling 117, or indirectly, through satellite 114 and wireless links 113 and 115. The next step (step 232) depends on the selected mode. When the registration mode is selected, the satellite station determines the subscriber's PTN from the pager code, uses the PTN to retrieve the subscriber's Customer Routing Point (CRP) record, and, finally, updates the record to reflect the new mode, terminating number, bandwidth, and protocol. When the call-by call mode is selected, the satellite station merely relays the updated parameters to an adjunct (described in application Ser. No. 08/379,425) where they are used to route calls to the subscriber. The update is complete after step 232 (step 234).

Figure 5:
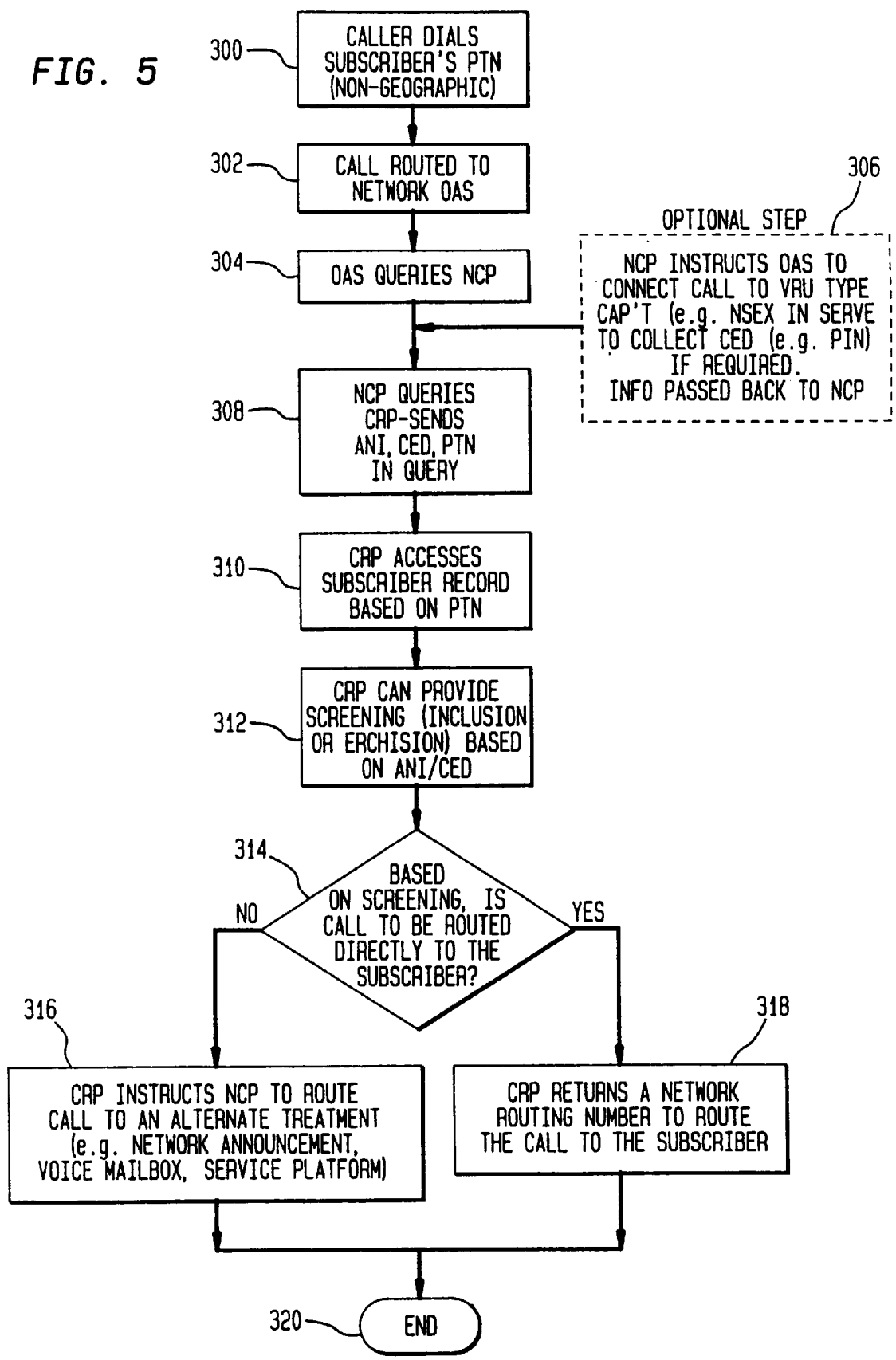
FIG. 5 is a flow chart depicting the procedure followed to route a call according to the present invention.

FIG. 5 shows, in flowchart form, the steps taken in routing a call in accordance with the present invention. In the following discussion of FIG. 5 references will be made to FIG. 2.

As shown in FIG. 5, a caller initiates a call by dialing the subscriber's PTN (step 300). The call is routed to the originating access switch (step 302) which queries the NCP for routing information (step 304). At this point, if the subscriber has provisioned for the collection of a CED, the NCP instructs the originating access switch to connect the call to the VRU for collection of DTMF digits, and to pass the collected digits back to the NCP (optional step 306). After collection of the CED digits, or immediately following step 304, whatever the case may be, the NCP queries the CRP for the subscriber record, sending the CRP the CED, PTN, and ANI (step 308). The CRP then retrieves the subscriber's record based on the PTN (step 310). The record includes the terminating number, bandwidth, and protocol, and may include instructions to screen the incoming call. If the subscriber has provisioned the subscriber record to initiate call screening, the CRP screens the incoming call (determines the appropriate treatment for the call) based on the CED and/or ANI (step 312).

Based on the screening performed in step 312, a decision is made on whether or not to route the call directly to the subscriber (step 314). If the call is not to be routed directly to the subscriber, the CRP instructs the NCP to route the call to an alternate treatment, such as a network announcement, voice mailbox, or service platform (step 316). If the call is to be routed directly to the subscriber, the CRP returns the terminating number, or "Network Routing Number", the bandwidth, and the protocol to the NCP. The NCP uses the number to route the call to the terminating telephone where it can be answered by the subscriber (step 318). The NCP may use the bandwidth and/or protocol to allocate a suitable channel for the call, and may use its knowledge of the subscriber's protocol to communicate with the subscriber in that protocol (i.e. the NCP may act as a protocol translator). After rerouting of the call, the processing of the call is complete (step 320).

Figure 7:
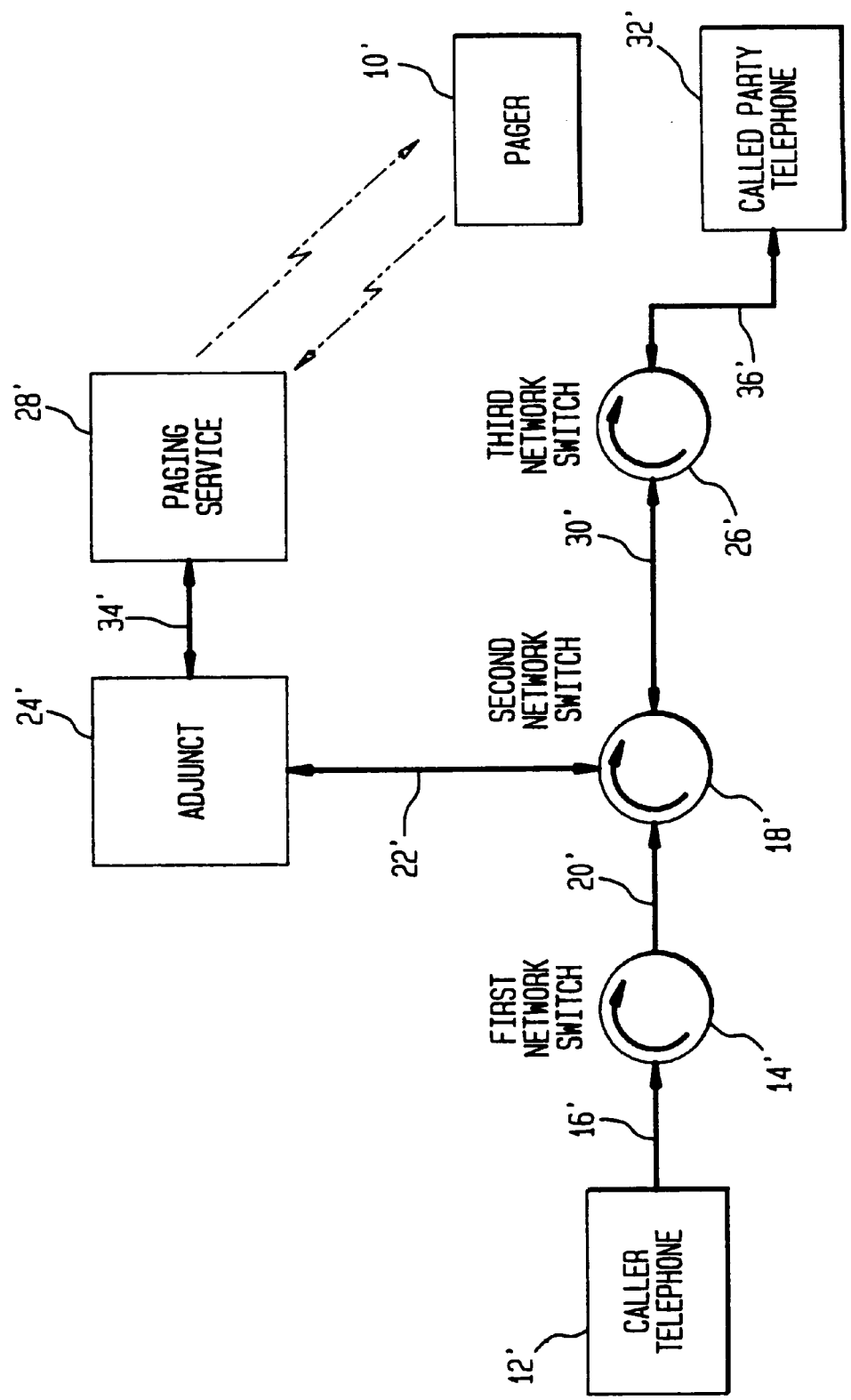
FIG. 7 is a block-schematic diagram of a communication system that may be used to implement call-by call mode routing.

Referring to FIG. 7, there is shown a block diagram containing the major elements of a communication system that may be used to implement call-by-call mode routing. As shown in the figure, a caller initiates a call from a caller telephone 12' to a mobile party who is equipped with a two-way pager 10'. The caller telephone is coupled to a first network switch 14' by a first communication coupling 16'. The first network switch is, in turn, coupled to a second network switch 18' by a second communication coupling 20'. The second network switch is coupled to an adjunct 24', via third communication couplings 22', and to a third network switch 26', via fourth communication coupling 30'. Thus, there is a path between the caller telephone and the adjunct, and a path between the caller telephone and the third network switch.

Adjunct 24' is an intelligent component that may be external to the network and connected to the network in the same way that a switch or telephone is connected. An example of an external adjunct is a Voice Response Units (VRU). Two possible ways of connecting the adjunct to a network are: via a Common Channel Interoffice Signaling (CCIS) link, and via an Integrated Services Digital Network (ISDN) communication link. In an alternative embodiment, the adjunct is an internal network element, such as a 4E switch, in which case the functioning of the adjunct remains the same but a connecting link is not required.

When a call is initiated by dialing the mobile party's PTN it is coupled to adjunct 24' via couplings 16', 14' and 22', and switches 14' and 18'. The adjunct puts the call on "hold" and, based on the mobile party's identity (known through the PTN), retrieves the information necessary to page the mobile party. This information may be contained in a database internal to the adjunct or it may be read from an external data base (not shown). Adjunct 24' passes the necessary paging information to a paging service 28' via a fifth communication coupling 34'. The paging service then broadcasts a paging activation signal and a caller identification signal, both intended for reception by two-way pager 10'.

Pager 10' is equipped with: an alarm that is activated in response to the pager activation signal, a display that is responsive to the caller identification signal, and a keyboard for specifying a terminating number, bandwidth, protocol, or a special instruction. A mobile party who is alerted to a call may check the pager's display to identify the caller and/or the bandwidth and protocol of the originating station. The mobile party may then decide how to treat the call based on the displayed information. One possible treatment is to route the call to a called party telephone 32'. The called party telephone may be a nearby telephone station or some remote telephone station, such as a secretary's station. To route the call to the called party telephone the mobile party keys the telephone number, bandwidth, and protocol of the called party telephone into the pager using the pager's keyboard, and then transmits the information to the paging service 28'. Alternatively, the terminating number, bandwidth, and protocol may be "keyed in" by choosing from among one or more adjunct provided choices that are transmitted to the pager via the paging service. In any case, the paging service passes the terminating number to the adjunct where it is used to route the call.

Other possible call treatments include those that may be used when the mobile party is busy. If the mobile party is busy with a call when a subsequent call to the party's PTN is placed, the party may route the subsequent call to an alternative terminating station, put the previous caller on hold and talk to the subsequent caller, or use the pager to transmit a conference call instruction to talk to both callers at the same time. Also, if the mobile party has routed the subsequent call but becomes free before the subsequent caller disconnects, the party may interrupt the routing of the subsequent call and redirect the call to the party.

In the configuration of FIG. 7, adjunct 24' routes the incoming call by holding the call at the adjunct while launching a second call from the adjunct to called party telephone 32'. This second call is routed through: communication coupling 22', second network switch 18', communication coupling 30', third network switch 26', and sixth communication coupling 36'. After the second call is complete the adjunct bridges the incoming call and the second call together so that the caller telephone is coupled to the called party telephone through the adjunct. As an alternative, the adjunct may merge the incoming call and the second call at the second network switch, in which case the adjunct drops from the call. Once the incoming call and the second call have been bridged, or merged, into a "routed call" the routed call may be answered by the mobile party at telephone 32'.

A similar procedure may be used to implement special call handling instructions. For instance, in the case of a conference call between two callers and the mobile party, the adjunct may bridge, or merge the two incoming calls from the callers to an outgoing call to the mobile party.

Figure 6:
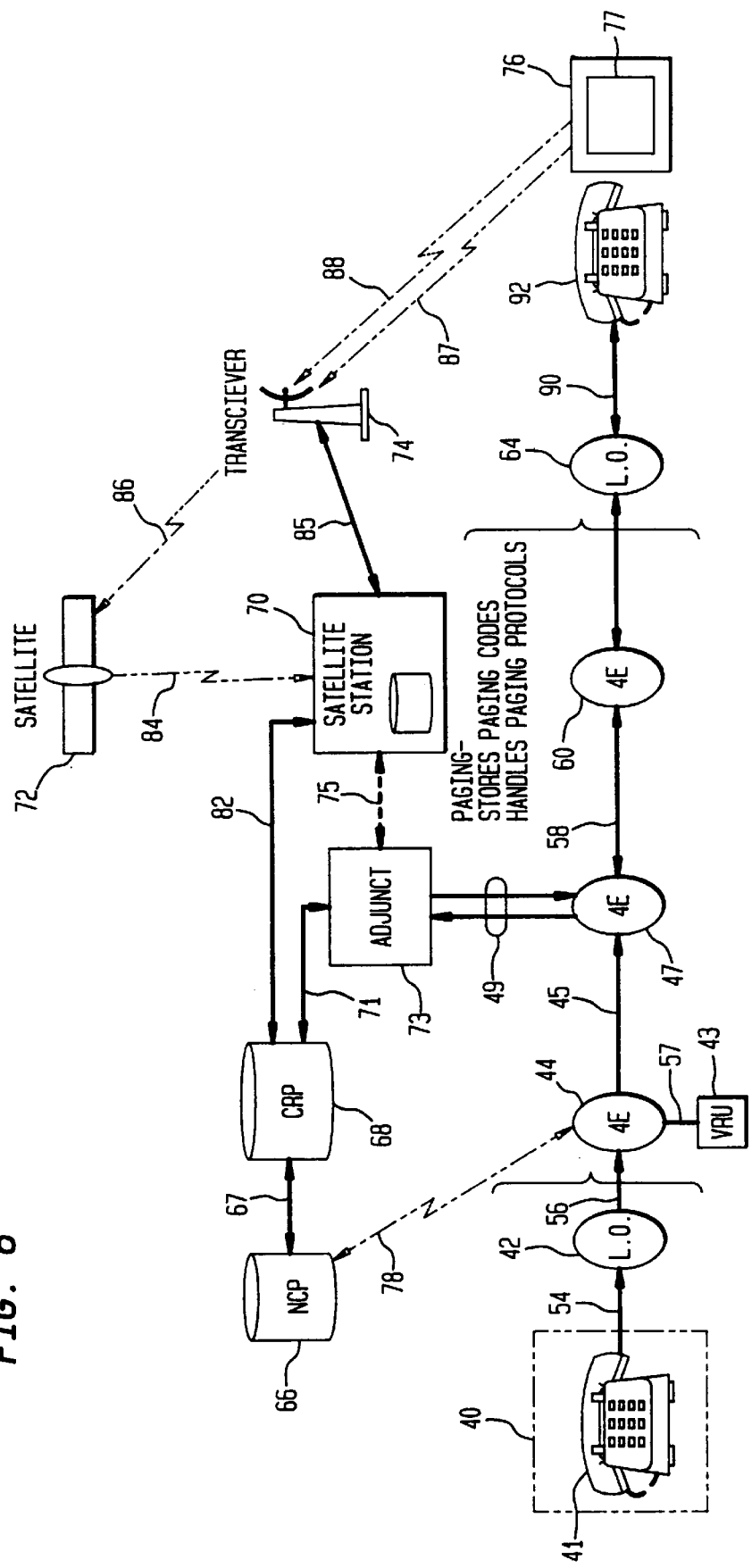
FIG. 6 is a block-schematic diagram of a further embodiment of a communication system in accordance with the present invention.

FIG. 6 is a block-schematic diagram of a further embodiment of a communication system in accordance with the present invention. FIG. 6 is identical to FIG. 2 with the exception of additional elements: adjunct 73, switch 47, communication couplings 45, 49, 71, 75, and wireless link 87. The system of FIG. 6 may be used to offer subscriber's all of the features associated with both the registration mode and call-by-call modes of operation.

Figure 8:
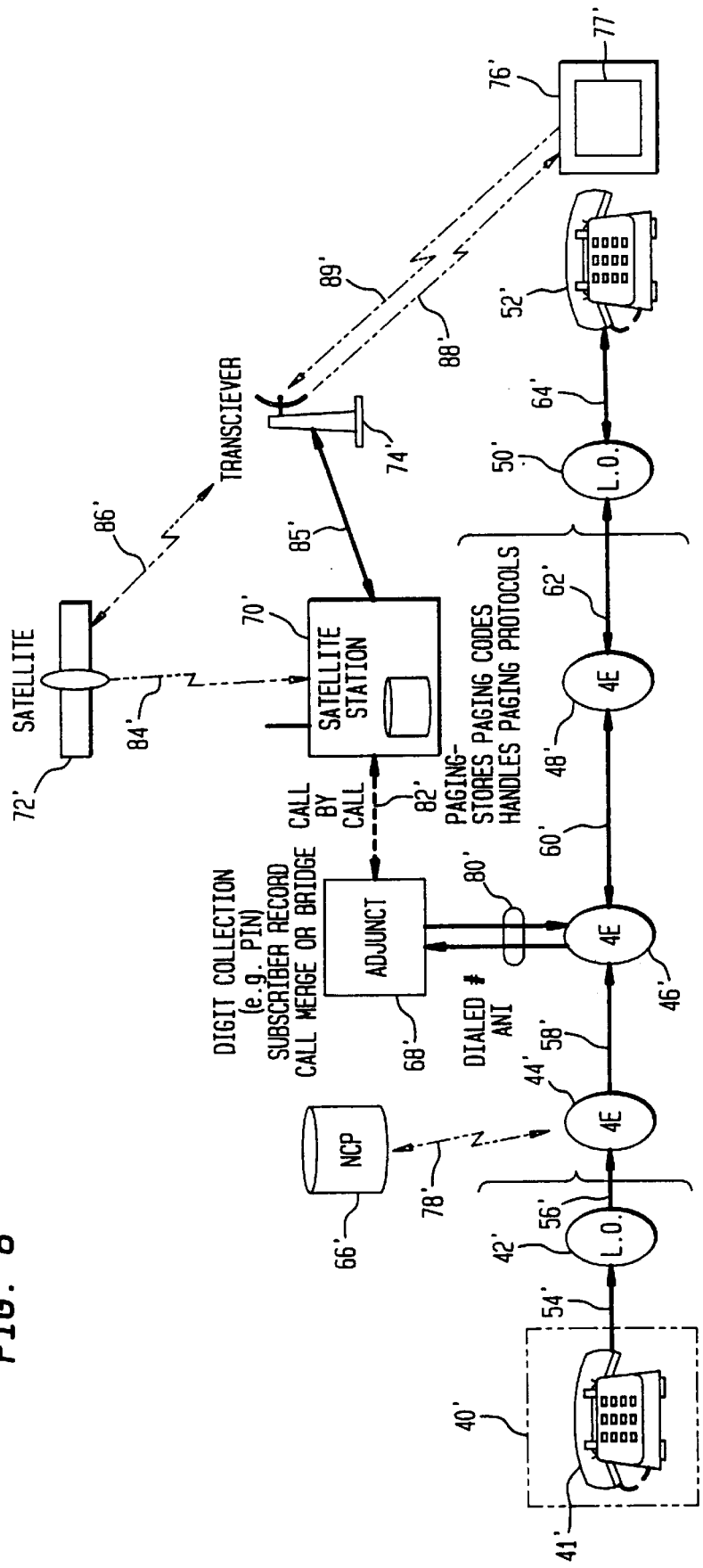
FIG. 8 is a block-schematic diagram of an existing telephone network incorporating the elements of FIG. 7.

FIG. 8, shows how call-by-call routing may be implemented in an existing telephone network. As shown, a caller 40' seeks to establish communications with a mobile party, or "subscriber", 76' who is equipped with a two-way pager 77'. The subscriber is assigned a Personal Telephone Number (PTN). The caller initiates an incoming call from a telephone 41' by dialing the mobile party's PTN. This incoming call is coupled to a local office 42'in the caller's locality through a telephone line 54'. The local office 42' routes the call to an originating access switch 44' over a trunk line 56'. Switch 44' may take the form of a digital switch, or an electronic switching system, such as an AT&T "4E" switch.

Once the call has been routed to switch 44', a Network Control Point (NCP) 66' receives the call's signaling information, including the dialed PTN, over a CCIS link 78'. The NCP uses the dialed number to retrieve routing information from the NCP's associated database. The NCP then routes the call over a trunk line 58' to a terminating access switch 46', which, like the originating access switch, may be a digital switch or a 4E switch. Switch 46' is connectable to an adjunct 68' via an ISDN link 80'. The terminating access switch is capable of merging calls in response to a signal from the adjunct.

The ISDN link provides adjunct 68' with both the called number (subscriber's PTN) and the calling number (Automatic Number Identification number, or "ANI"). The adjunct retrieves the subscriber's record and current status information based on the PTN. From the subscriber's record the adjunct also determines whether or not the subscriber is provisioned to receive a Personal Identification Number (PIN). If the subscriber is so provisioned, adjunct 68' plays a standard prompting announcement to the caller after which the PIN is collected from the caller by the reception of up to 10 digits, indicated, e.g., in the form of Dual Tone Multi-Frequency (DTMF) signals. In a system using PINs, provision must be made for the case where a caller can not enter a PIN because the caller is at a rotary dial station and for the case where a caller does not respond to the prompt. In these two cases, adjunct 68' may allow for a time-out or an abbreviated dialing sequence (e.g., #) to denote that no PIN is forthcoming. Regardless of whether or not a PIN is collected, adjunct 68' proceeds to determine if the subscriber 76' is busy with another call to the subscriber's PTN. It stores this determination, and then continues processing the call.

At this point, the adjunct plays an announcement that the system will "search" for subscriber 76'. On a subscriber pre-provisioned basis, adjunct 68' may play an announcement to the caller 40' as an inducement to remain on the line while awaiting call completion. Meanwhile, the adjunct retrieves the subscriber's pager code (known from the PTN) and transmits the code along with the caller's ANI (or PIN, if so provisioned) to a satellite station 70' via a communication link 82'.

The satellite station broadcasts the pager code and ANI (or PIN) to a paging transceiver 74' either through a satellite 72' or through a communication coupling 85'. When the satellite is used, the pager code and ANI (or PIN) are transmitted to the satellite by way of a wireless link 84'. The satellite, in turn, broadcasts the pager code and ANI (or PIN) to the transceiver by way of a wireless link 86'.

Communication coupling 85' is used when the two-way pager is equipped for location registration. Under the location registration scheme, the two-way pager periodically sends out a signal from which the satellite station determines the region within which the mobile party is located. Once the satellite station knows the mobile party's region, it need only send the paging information to the transceiver associated with that region. In this manner, the need for a national broadcast to all transceivers via satellite is obviated. Thus, when location registration is used satellite station 70' may transmit the pager code and ANI (or PIN) to transceiver 74' via communication coupling 85'. It will be understood by those of ordinary skill in the art that separate communication couplings from the satellite station to each transceiver are not required. Rather, signals to a transceiver that is not directly linked to the satellite station may be relayed to that transceiver over a transceiver network linked to the satellite station.

Regardless of whether satellite 72' or communication coupling 85' is used, the transceiver 74' broadcasts a paging signal that includes the pager code and ANI (or PIN) to the subscriber's pager. Broadcasting from transceiver 74' to pager 77' is represented by a wireless link 88'. Upon receipt of the paging signal from the transceiver, the subscriber is alerted to the call and responds by sending a routing signal. The subscriber may include any one of a number of possible responses in the routing signal.

The subscriber may elect to route the call to a telephone station of the subscriber's choice, in which case, the subscriber uses the two-way pager to transmit the number, bandwidth, and protocol of the desired terminating telephone station to the transceiver. In a preferred embodiment, the alerting page includes the bandwidth and/or protocol of the originating telephone 41'. In such an embodiment the pager could display the bandwidth and/or protocol to the subscriber and the subscriber could then chose a terminating station of matching bandwidth and/or protocol. As an alternative, the subscriber may not specify a terminating station at all, but rather, may route the call to voice mail, or some other treatment, in which case the subscriber uses the pager to transmit a number associated with the desired treatment.

The independence of the paging and communication paths makes it possible for the subscriber to route calls directed to the subscriber's PTN even when the subscriber is busy with an earlier call. This will be true regardless of whether the earlier call was directed to the subscriber's PIN or directly to the telephone station at which the subscriber answered the earlier call. Thus, in an illustrative scenario, the subscriber routes a first caller to a nearby telephone station and answers the call at that station. Then, while talking to the first caller, the subscriber routes a second caller to a secretary, routes a third caller to voice mail, and so on. Thus, subsequent calls may be routed without interruption of the first call and without the first caller becoming aware of them. Moreover, the subscriber can control the call parameters for each of the subsequent calls.

In addition to transmitting call routing instructions, the subscriber may transmit special call handling instructions, indicating that specific actions are to be taken, such as putting a caller on hold, switching between callers, creating a conference call, and releasing a call from voice mail and routing it to the subscriber. In one possible embodiment, these special instructions are implemented by assigning them a number that the subscriber sends to the transceiver in the same way that a terminating number is sent. Thus, in an example of switching between callers, a busy subscriber who receives a second call may send the number 999 to the transceiver indicating that the first caller should be put on hold and the second caller routed to the subscriber's present telephone station. In an example of releasing a call from voice mail, a busy subscriber who has routed a subsequent call to voice mail but later becomes free to take the subsequent call, may send the number 000 to the transceiver before the subsequent caller is disconnected from voice mail, the 000 indicating that the subsequent call should be released from voice mail and routed to the subscriber.

Regardless of the call handling treatment chosen by the subscriber, the two-way pager transmits the routing signal to transceiver 74', as represented by wireless link 89'. The transceiver relays the two-way pager's transmissions to satellite station 72', either through satellite 72' via wireless links 86' and 84', or through communication link 85'. The satellite station then relays the subscriber's instructions to the adjunct via communication link 82', and the adjunct responds accordingly.

To route the call to a called party telephone 52', the adjunct initiates a second call. The second call is routed to a third access switch 48' via a trunk line 60' (like switches 44' and 46', switch 48' may be a digital switch or a 4E switch). The third access switch then routes the second call to a local end office 50' based on the terminating number, bandwidth, and protocol provided by the subscriber, the terminating number being the number of the called party telephone 52' to which the original call will be routed. The local end office couples the second call to the called party telephone via a telephone line 64'. In routing the call, the adjunct and/or second access switch may use the bandwidth and/or protocol to allocate a suitable channel for the second call, and may use its knowledge of the subscriber's protocol to communicate with the subscriber according to that protocol (i.e. the adjunct or second access switch may act as a protocol translator).

Upon completion of the second call, the call from the caller to the PTN (on hold at the adjunct) and the second call are either bridged together within adjunct 68' (in which case the adjunct remains with the call), or merged at switch 46' (in which case the adjunct drops from the call). If the calls are bridged, the adjunct may implement the features of putting a caller on hold, switching between callers, creating a conference call, and interrupting a previously routed call. Whereas, if the calls are merged, switch 46' may implement these features under direction from the adjunct.

During the interval of time between the dialing of the subscriber's PTN to initiate a call and the final disposition of that call (the call set up time), an announcement may be played to the caller as an inducement to stay on the line while the call is processed.

FIGS. 3, 4A and 4B will be referenced in the following discussion of the procedure for updating the terminating number, bandwidth, and protocol in accordance with the call-by-call mode.

The first step the subscriber takes in updating the call control parameters is to depress menu key 104 on pager 100 (step 202). The word "update" will appear in display 102. The subscriber then depresses select key 106 to select "update" (step 204). The word "update" will flash in the display to indicate that the subscriber may enter the update information (step 206). The subscriber may now input the call control parameters via keypad 108 followed by the # key to indicate the end of input (step 208). To enter a special call handling instruction, such as a conference call instruction, a number associated with that instruction would be input rather than a terminating number (step 208). A subscriber who does not want to change the call control parameters and does not want to input a special instruction number may simply depress the # key without keying in any updated parameters.

Moreover, in one possible embodiment, the pager is equipped with the ability to store call control parameters so that abbreviated key sequences may be used to change the active parameters. For example, the subscriber's office telephone number, may be stored in the pager's memory at a first location and the subscriber's home telephone number may be stored in the pager's memory at a second location. Thereafter, when the subscriber wants to change the terminating number to the office number, the subscriber simply keys in a 1 followed by the # sign. Similarly, when the subscriber wants to change the terminating number to the home number, the subscriber simply keys in a 2 followed by the # sign.

In any case, after receiving a # input, the pager's mode indicator will flash (step 210). At this point, the subscriber must select the desired mode (step 212) (To implement call-by-call routing the subscriber would select call-by-call mode). The pager determines if the desired mode is the current mode (step 214/222). If the subscriber desires the call-by-call mode and the current mode is not the call-by-call mode, then before the flashing mode indicator goes steady, the subscriber depresses select key 106 to change to call-by-call mode (step 224). If the current mode is the call-by-call mode, the subscriber allows a period of time to pass, after which the flashing mode indicator will go steady;

or, in the alternative, the subscriber may depress the # key to curtail timing and retain the current mode (step 226). After the mode has been selected, the pager signals the transceiver 112, sending the pager code, updated terminating number, updated bandwidth, updated protocol, and a call-by-call mode indicator (step 228).

Following reception of the pager's transmission, represented by wireless link 111, transceiver 112 relays the pager code, updated call control parameters, and mode indicator to satellite station 116 either through wireless link 113, satellite 114, and wireless link 115; or, when location registration is used, through communication link 117 (step 230). Finally, the satellite station relays the information to the adjunct where it is used to route an incoming call (step 232). At this point the update is complete (step 234).

Figure 9A:
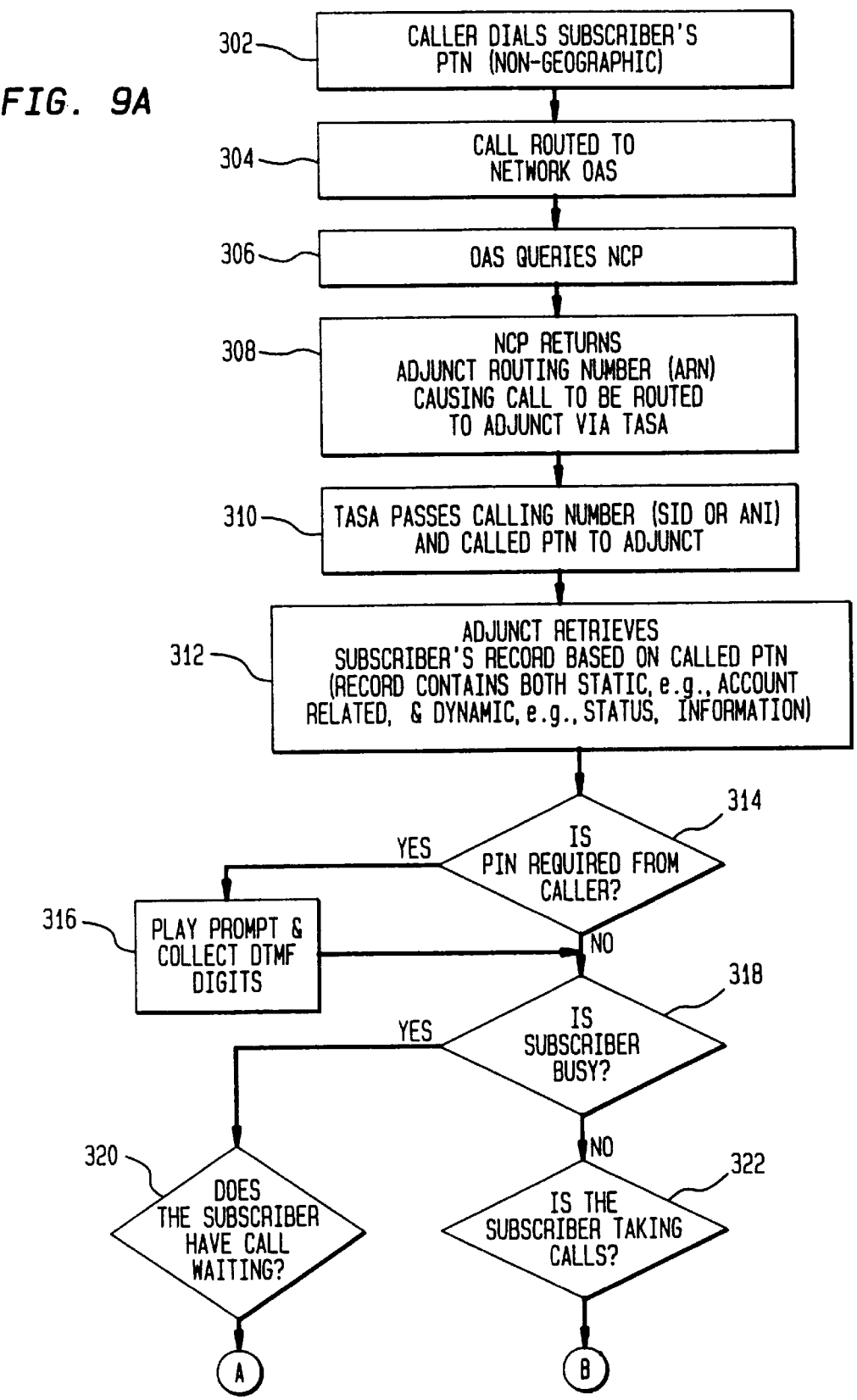
FIGS. 9A and 9B make up a flowchart depicting the steps taken in routing calls on a call-by call basis.
Figure 9B:
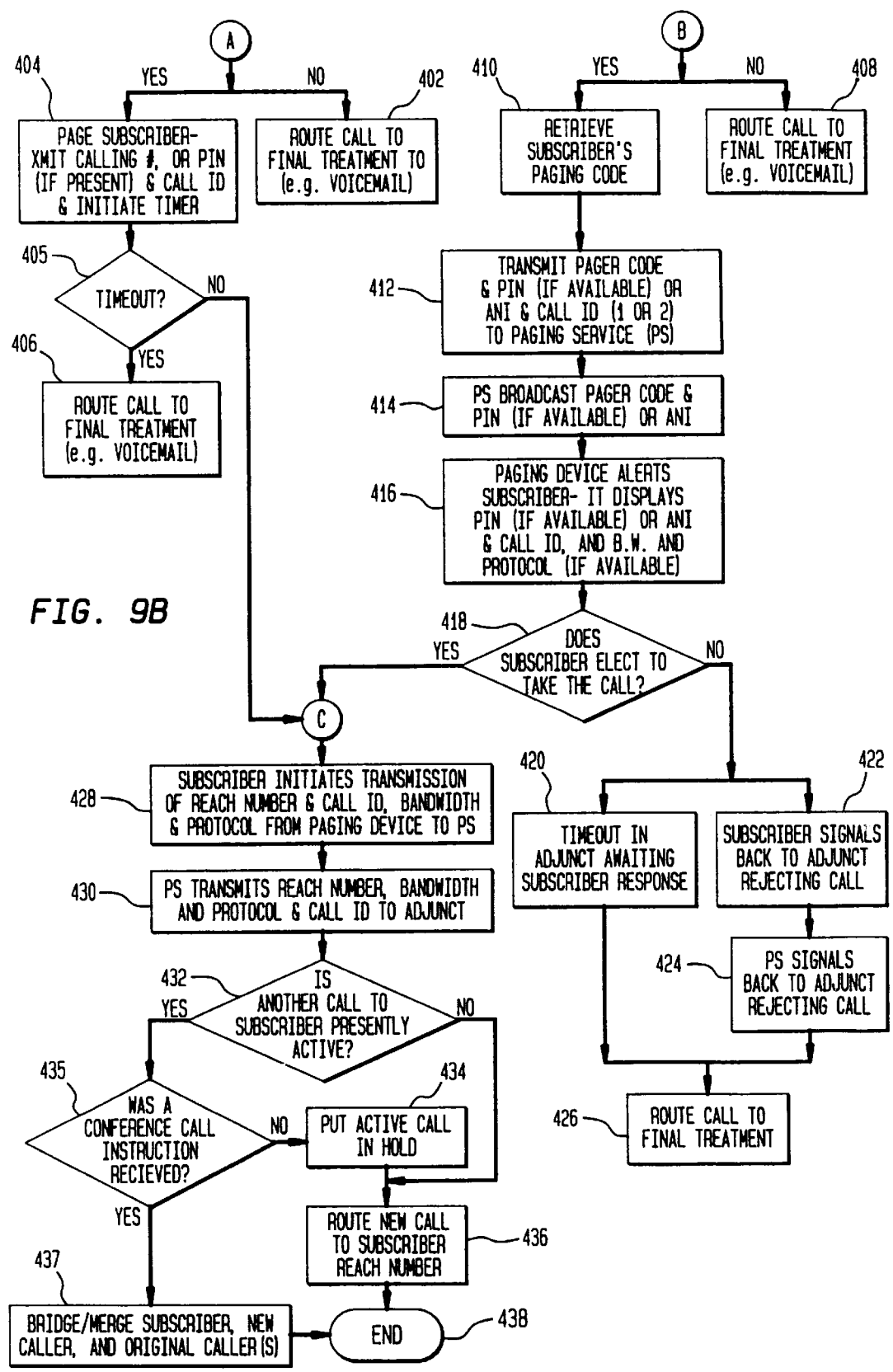

FIGS. 9A and 9B show, in flowchart form, the steps taken in routing calls on a call-by-call basis. In the following discussion of FIGS. 9A and 9B references will be made to FIG. 8.

The call-by-call procedure is invoked when caller 40' dials the subscriber's PTN (step 302). The call is routed to originating access switch 44', or "OAS", (step 304) and the OAS queries NCP 66' (step 306). The NCP returns an Adjunct Routing Number (ARN) to the OAS, causing the call to be routed to adjunct 68' via terminating access switch 46', or "TAS A", (step 308). The terminating access switch passes the calling number, determined through ANI, and the called PTN to the adjunct (step 310). The adjunct then retrieves the subscriber's record based on the dialed PTN (step 312) and determines if the subscriber has provisioned for a PIN to be collected from the caller (step 314).

If a PIN has been provisioned for, adjunct 68' plays a prompt and collects DTMF digits (step 316). If a PIN has not been provisioned for, the procedure skips to step 318 which is to determine if the subscriber is busy (i.e., if a call to the subscriber via the adjunct is in progress).

If the subscriber is busy, the next step is to check if the subscriber has Call Waiting (step 320). If the subscriber does not have Call Waiting, the call is routed to final treatment, such as Voice Mail (step 402). If the subscriber does have Call Waiting, the subscriber is paged, the paging signal including the pager code, calling number (or PIN), bandwidth of the originating telephone, protocol of the originating telephone, and a call identifier (step 404). If the subscriber does not respond to the page within some predetermined time after the page is sent (step 405), the caller is "timed out" and the call is routed to final treatment (step 406). The subscriber may respond within the allotted time by initiating transmission of a terminating (or "reach") number, bandwidth, and protocol; or a conference call instruction (step 428). In the case of a subscriber responding within the allotted time, processing of the call continues in accordance with the steps following step 428.

If it is determined in step 318 that the subscriber is not busy, adjunct 68' determines whether or not the subscriber is taking calls (step 322). If calls are not being accepted, the call is routed to final treatment (step 408). Otherwise, the adjunct retrieves the subscriber's pager code (step 410) and transmits the pager code, calling number (or PIN), and call identifier to the paging service (step 412). The paging service then broadcasts the information (step 414) to pager 77' which alerts the subscriber and displays the calling number (or PIN), the call identifier and, if available, the bandwidth and protocol of the calling station (step 416). At this point, the subscriber may accept or reject the call (step 418).

There are two ways by which the subscriber may reject the call. The subscriber may do nothing, in which case the caller will be timed out (step 420) and the adjunct will route the call to final treatment (step 426). Or, the subscriber may send a rejection signal (a special instruction) to the paging service (step 422), in which case the paging service will relay the rejection signal to the adjunct (step 424) and the adjunct will cause the call to be routed to final treatment (step 426). If the subscriber elects to take the call, the subscriber initiates transmission of a reach number, bandwidth, and protocol by way of two-way pager 77' (step 428).

Thus, the subscriber may transmit either a reach number, bandwidth and protocol; or a conference call instruction at step 428 of the process. Upon receipt of a number, bandwidth, and protocol, the paging service transmits the information and the call identification to the adjunct (step 430). Next, the adjunct checks whether or not there is another presently active call to the subscriber (step 432).

In the event there is a presently active call, the adjunct checks to see if a conference call instruction was received (step 435). If a conference call instruction was not received, the adjunct puts the active call on hold (step 434) and bridges/merges the new call to the subscriber (step 436). If a conference call instruction was received, the adjunct bridges/merges the new call to both the subscriber and the original caller (step 437).

In the event there is not another presently active call, step 434 is skipped and the adjunct bridges/merges (step 436) the new call to the subscriber immediately following step 432. The procedure is complete upon bridging/merging of the call (step 438).

Referring back to FIG. 6, adjunct 73, switch 47, communication couplings 45, 49, 75, and wireless link 87 function in the same manner as their counterpart elements in FIG. 8 (viz. adjunct 68', switch 46', communication couplings 48', 80', 82', and wireless link 88'). When the call reaches switch 44, switch 44 queries NCP 66 which, in turn, queries CRP 68 for instructions. If the subscriber has only subscribed to registration type service the call may be handled according to the procedures set forth in connection with FIG. 5. However, if the subscriber has subscribed to features available only through call-by-call type service, such as the conference call feature, the CRP directs switch 44 to route the call to adjunct 73. Once the call has been redirected to the adjunct, the adjunct may handle the call according to the procedures set forth in connection with FIGS. 9A and 9B. Thus, both registration and call-by-call type service may be offered through the configuration of FIG. 6.

As an added feature of the preferred embodiment of FIG. 6, adjunct 73 is coupled to CRP 68 via communication coupling 71. Accordingly, when the CRP directs a call to the adjunct, the adjunct can query the CRP for the subscriber's record and current status information. In this manner the CRP may act as the database from which the adjunct retrieves the paging information necessary to implement call-by-call routing.

In addition to "registration" and "call-by-call" procedures described above, the preferred embodiment is capable of routing calls according to a "subsequent routing" procedure, a "revertive calling" procedure, and a "call examination" procedure.

The subsequent routing procedure is used to route calls that have already been routed in accordance with one of the other procedures. To initiate subsequent routing the subscriber uses the two-way pager to transmit a subsequent routing signal to the paging service. The subsequent routing signal includes subsequent call control parameters, e.g., a subsequent terminating number, a subsequent bandwidth, and/or a subsequent protocol. Such subsequent parameters may be different than those used to initially route the call. The network uses the subsequent parameters to "readjust" the call when completed to the subsequent station to best conform the call to the desired subsequent parameters.

The subsequent routing signal further includes a subsequent routing indicator. The subsequent routing indicator serves to distinguish the subsequent routing signal from a "registration update". The two types of signals must be distinguished since subsequent routing requires that immediate rerouting action be taken, as contrasted with a registration update, which does not require that any immediate action be taken, but rather, sets up a routing that will take place at some later time. When a subsequent routing signal is received prior to completion of the original call, the CRP, or adjunct, whatever the case may be, reroutes the call in the same way that an initial call is routed. When a subsequent routing signal is received after the original call has been answered, the original call may be terminated prior to rerouting.

Figure 10:
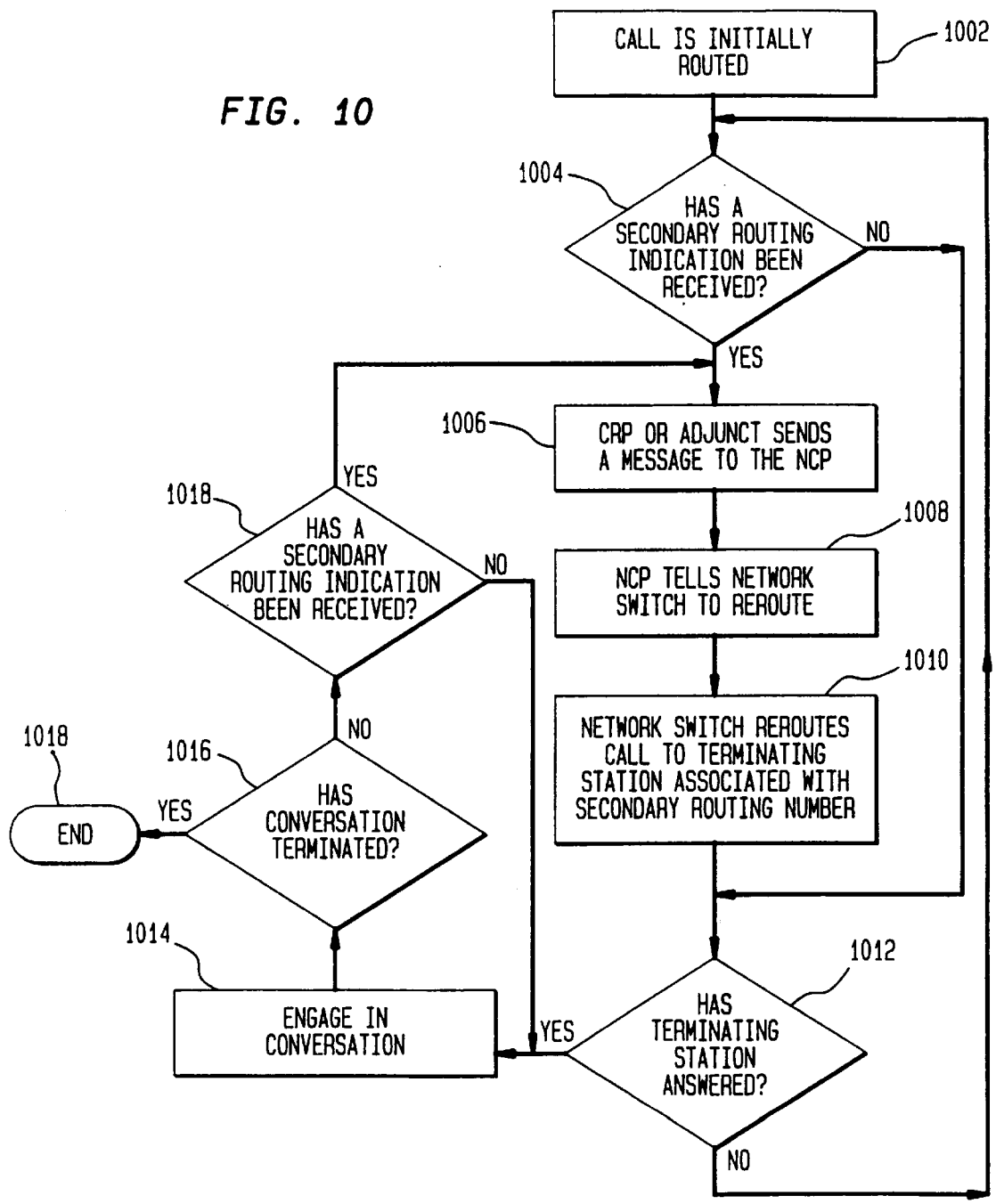
FIG. 10 is a flowchart showing how subsequent routing is implemented in the preferred embodiment of FIG. 6.

FIG. 10 is a flowchart showing how subsequent routing is implemented in the preferred embodiment of FIG. 6. By definition subsequent routing occurs after a call has been initially routed (step 1002). A subsequent routing signal may be received at any time after initial routing. Thus, the system continuously checks to see if such a signal has been received (step 1004). If a subsequent routing signal is not received, call routing proceeds as normal. That, is the system checks to see if the call has been answered (step 1012), and if it has the caller and subscriber may engage in conversation (step 1014). If a subsequent routing signal has been received, then a series of steps are taken. First, the CRP (or adjunct) sends a message containing the subsequent terminating number, bandwidth, and protocol to the NCP (step 1006). Next, the NCP passes the subsequent terminating number, bandwidth, and protocol to the network switch (step 1008). Finally, the network switch reroutes the call (step 1010). As an alternative to steps 1006, 1008 and 1010, the adjunct may reroute the call without involving the NCP or CRP.

In any event, following rerouting, but before the call is terminated, another subsequent routing signal may be received. Thus, an answered call is checked for termination (step 1016). If the call has not terminated. The system continues to check for subsequent routing indications (step 1018). If the call has terminated, the subsequent routing procedure loop is exited (step 1020).

The revertive calling procedure is invoked when a subscriber chooses to initiate a call from the desired terminating station rather than transmit the terminating station's number and then wait to answer the call. Such a procedure may be used, for example, when the desired terminating stations telephone number is unknown. To implement revertive calling the routing signal sent by the subscriber includes a revertive calling indicator rather than a terminating number. The indicator tells the network to hold any incoming calls placed to the subscriber and await a return call from the subscriber. After the subscriber places a return call from the desired terminating station, the return call and the incoming call are bridged (or merged) to route the call from the caller to the subscriber. In addition to the revertive calling indicator, the subscriber may include in the routing signal the bandwidth and protocol of the telephone station from which the subscriber plans to dial the return call. In any event, revertive calling may be of the "call-by-call" type, in which the subscriber provides a revertive calling indicator in response to a page, or of the "registration" type, in which a revertive calling indicator is fetched from the CRP (or adjunct) without first paging the subscriber.

The call examination procedure is invoked when a subscriber chooses to have the network automatically route incoming calls to a called party communication device most capable of supporting the caller communication device. In this procedure, the routing signal need only include a location indicator, which is associated with a location where one or more called party communication devices are present. Called party communication device parameters, such as bandwidth and protocol, for each of the possible called party communication devices associated with the location are stored in the CRP (or adjunct) on a pre-provisioned basis. The routing of a call via call examination proceeds as follows. Upon initiation of a call to a subscriber, the network notes that a location indicator has been received from the subscriber—either through "registration" or "call-by-call" type service. The network then "examines" the call to determine the caller communication device parameters (e.g. the bandwidth and protocol of the caller communication device). Such examination is known in the art; and, in light of this disclosure, applying such examination in the present invention will be apparent to one skilled in the art. Once the call has been examined, and the caller communication device parameters determined, the network compares them to the parameters of the called party communication devices for the given location. The call is routed to the called party communication device that is at the given location and has parameters most closely matching those of the caller communication device. The matching of parameters may be performed through the use of an algorithm, look up table, or any other well known method.

The call-by-call, revertive calling, and call examination procedures, discussed above, require that an alerting page be sent to the subscriber and that the network hold the incoming call while awaiting a subscriber response. However, in those situations where the subscriber has turned off her pager, the subscriber is not carrying her pager, the pager is out of range, or the pager's battery is dead, the pager is "unreachable". Thus, the alerting page will not be received and a response will not be sent. To account for such situations a pager status feature is included in a preferred embodiment of the invention. The pager status feature will be described below in the context of call-by-call routing. From the description, the implementation of the feature in the other procedures will be apparent to one of skill in the art.

Figure 11:
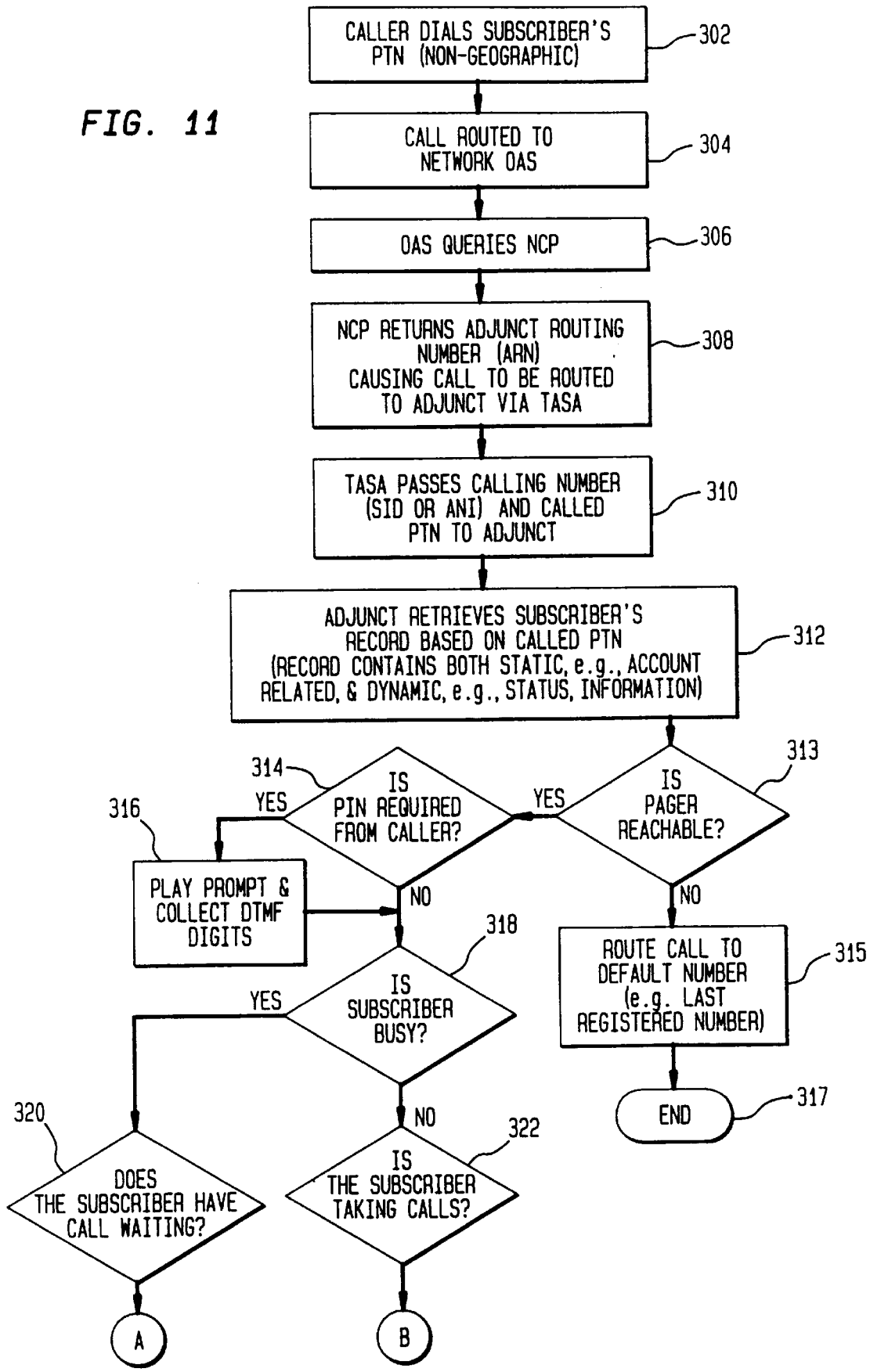
FIG. 11 is a flowchart which shows the additional call routing steps that must be taken when the call-by-call routing service of the present invention includes a pager status feature.

FIG. 11 is a flowchart which shows the additional call routing steps that must be taken when the call-by-call routing service of the present invention includes a pager status feature. The steps depicted in the flowchart are the same as those depicted in the flowchart of FIG. 9A, with the exception that a pager status branch, consisting of three steps (steps 313, 315 and 317), is included. In accordance with the call-by-call routing procedure previously described, step 312 involves retrieval of the subscriber's record. When the pager status feature is implemented, this record includes an indication of whether or not the pager is reachable. To generate such an indication, the paging service, on its own, or in response to a request from the network, may periodically query the pager using a page to which the two-way pager must automatically respond, i.e., it will respond without requiring any user intervention. The result of the paging service's query is placed in the subscriber's record and serves as the status indicator.

Following retrieval of the subscriber's record, the network determines if the pager is reachable (step 313). If the pager is reachable, processing of the call-by-call routing proceeds as usual, continuing with step 314. If the pager is not reachable, the incoming call is routed to a default station that is associated with a default number, such as the most recently registered terminating number or a voice mail number (step 315). In this manner, an alerting page is not sent to an unreachable pager. After rerouting to the default number, processing of calls to a subscriber with an unreachable pager is complete (step 317).

In a preferred embodiment, the two-way pager is equipped with an "automatic off" switch. In one implementation of an automatic off switch, which is suitable for use in the present invention, a body temperature sensor is coupled to the pager such that when the pager is removed from the subscriber's person the sensor detects a temperature drop and triggers the pager's off switch. Thus, when the subscriber is not wearing the pager, the pager automatically turns off and becomes unreachable. In this manner the automatic off switch prevents pages from being sent to a subscriber who is not likely to receive the page because the subscriber is not the carrying the pager. As an added feature, prior to turning off, the pager may initiate transmission of a notification signal to the network, indicating that the pager is unreachable. When this feature is employed, the network is notified immediately that the subscriber is not carrying the pager, and thus there is no inter-query period during which a useless page might be sent.

While the best mode for carrying out the invention has been described in detail, those familiar with the art to which the invention relates will recognize various alternative designs and embodiments for practicing the invention as defined by the following claims.

We claim:

1. A method for routing a call that is initiated from a first communication device and is directed to a subscriber's personal telephone number, the subscriber being equipped with a two-way pager, comprising:
   a) determining whether the two-way pager is reachable;
   b) when the two-way pager is unreachable, routing the call to a default station; wherein said determining is performed without sending a page to the two-way pager in response to the call; and
   c) when the two-way pager is reachable, coupling the call to a voice response unit, using said voice response unit to collect one or more entered digits, automatically screening the call based on said entered digits to determine whether the call should be routed to a second communication device associated with said call control parameters or routed to an alternative treatment, and routing the call in response to the result of said screening.

2. A system for routing a call that is initiated from a first communication device and is directed to a subscriber, the subscriber being equipped with a two-way pager, said system comprising:
   a) means for (i) determining prior to accessing the subscriber whether the two-way pager is reachable, and (ii) routing the call to a default station when the two-way pager is determined to be unreachable;
   b) means for receiving one or more call control parameters when the two-way pager is determined to be reachable, said parameters originating from the two-way pager and being associated with a second communication device; and
   c) means for using said call control parameters to process the call for completion at said second communication device when the two-way pager is reachable.

3. A system according to claim 2, further comprising:
   a means for receiving one or more subsequent call control parameters, said subsequent parameters originating from said two-way pager and being received after said call control parameters were used in said using step to route the call to said second communication device; and
   a means for using said subsequent parameters to reroute the call to a third communication device.

4. A system according to claim 2, wherein when said two-way pager is reachable the method further comprises:
   means for retrieving a pager code for the subscriber; and
   means for initiating a page to the subscriber.

5. A system for routing a call that is initiated from a first communication device and is directed to a subscriber's personal telephone number comprising:
   a paging service adapted to determine whether a two-way pager is reachable prior to accessing the subscriber;
   the two-way pager configured to route the call to a default station when the subscriber is unreachable, wherein the two-way pager does not receive a page in response to the call; and
   a network capable of receiving one or more call control parameters, said call control parameters originating from the two-way pager and being associated with a second communication device, and the network adapted to using said call control parameters to route the call to said second communication device associated with said parameters when the two-way pager is reachable.

6. A system according to claim 5, wherein the network is configured to request from the pager service whether the two-way pager is reachable.

7. A system according to claim 5, wherein the two-way pager is equipped with an automatic off switch, which when activated causes the two-way pager to become unreachable.

8. A system according to claim 6, wherein the two-way pager is equipped with an automatic off switch, which when activated causes the two-way pager to become unreachable.

9. A system for routing a call that is initiated from a first communication device and is directed to a subscriber, the subscriber being equipped with a two-way pager, said system comprising:
   a) means for (i) determining prior to accessing the subscriber whether the two-way pager is reachable, and (ii) routing the call to a default station when the two-way pager is determined to be unreachable;
   b) when the two-way pager is determined to be reachable, means for receiving a revertive call indicator, said revertive call indicator being originated from the two-way pager by the subscriber; means for holding said call in response to receiving said revertive call indicator until a return call is initiated from a second communication device; and means for bridging the call to said second communication device in response to said return call.

10. A system for routing a call that is initiated from a first communication device and is directed to a subscriber, the subscriber being equipped with a two-way pager, said system comprising:
   a) means for (i) determining prior to accessing the subscriber whether the two-way pager is reachable, and (ii) routing the call to a default station when the two-way pager is determined to be unreachable;
   b) when the two-way pager is determined to be reachable, means for determining an identification number for the first communication device; means for automatically screening the call based on said identification number to determine whether the call should be processed for completion to the subscriber; and means for routing the call in response to the result of said screening.

11. A system for routing a call that is initiated from a first communication device and is directed to a subscriber, the subscriber being equipped with a two-way pager, said system comprising:

a) means for (i) determining prior to accessing the subscriber whether the two-way pager is reachable, and (ii) routing the call to a default station when the two-way pager is determined to be unreachable;

b) when the two-way pager is reachable, means for receiving and storing one or more call control parameters at a database prior to the initiation of the call, said call control parameters originating from the two-way pager and being associated with said default station; means for retrieving said call control parameters from said database; and means for using said call control parameters to route the call to said default station.

* * * * *